(12) United States Patent
Chuang et al.

(10) Patent No.: US 8,711,231 B2
(45) Date of Patent: Apr. 29, 2014

(54) DIGITAL IMAGE PROCESSING DEVICE AND PROCESSING METHOD THEREOF

(75) Inventors: Che-Lun Chuang, Hsinchu (TW); Chung-Ta Wu, Taichung (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 264 days.

(21) Appl. No.: 13/198,725

(22) Filed: Aug. 5, 2011

(65) Prior Publication Data

US 2012/0287311 A1    Nov. 15, 2012

(30) Foreign Application Priority Data

May 13, 2011   (TW) .............................. 100116869 A (51) Int. Cl.
*H04N 5/228* (2006.01)

(52) U.S. Cl.
USPC .................................................... 348/208.13

(58) Field of Classification Search
USPC .................................................... 348/208.13
See application file for complete search history.

(56) References Cited

U.S. PATENT DOCUMENTS

| 7,593,037 | B2 * | 9/2009 | Matsumoto et al. | 348/208.13 |
| 7,596,284 | B2 * | 9/2009 | Samadani | 382/299 |
| 7,990,428 | B2 * | 8/2011 | Yano et al. | 348/222.1 |
| 2007/0269137 | A1 * | 11/2007 | Ida et al. | 382/299 |
| 2011/0050918 | A1 * | 3/2011 | Tachi | 348/208.4 |

* cited by examiner

*Primary Examiner* — Anthony J Daniels
(74) *Attorney, Agent, or Firm* — Jianq Chyun IP Office (57) ABSTRACT

A digital image processing device and processing method thereof are provided. The device includes a digital image capturing module, an image enlarging module, an image correcting module, and an image blending module. The digital image capturing module captures a plurality of first resolution images. The image enlarging module enlarges the first resolution images and produces a plurality of second resolution images. The image correcting module selects a target image and produces a plurality of corrected images. The image blending module performs direction gradient operation on each of the pixels of the target and corrected images and produces a plurality of gradient differential values. The image blending module performs a weighting sum operation on each of the pixels of the target and corrected images and produces a third resolution images.

14 Claims, 5 Drawing Sheets

---

Using an image enlargement method to enlarge resolutions of the first resolution images to produce a plurality of second resolution images — S610

Selecting one of the second resolution images to serve as a target image, taking the remained second resolution images as a plurality of unselected images, and performing a plurality of motion corrections to the unselected images to produce a plurality of corrected images — S620

Performing a plurality of direction gradient operations on each of pixels of the target image and each of pixels of the corrected images, and performing a weighting sum operation on each of the pixels of the target image and each of the pixels of the corrected images according to a plurality of gradient differential values generated by the direction gradient operations, so as to produce a third resolution image — S630

DIGITAL IMAGE PROCESSING DEVICE AND PROCESSING METHOD THEREOF

CROSS-REFERENCE TO RELATED APPLICATION

This application claims the priority benefit of Taiwan application serial no. 100116869, filed May 13, 2011. The entirety of the above-mentioned patent application is hereby incorporated by reference herein and made a part of this specification.

BACKGROUND OF THE INVENTION

1. Field of the Invention

The invention relates to a digital image processing technique. Particularly, the invention relates to an enlargement technique for a super-resolution image.

2. Description of Related Art

High resolution images can be applied to various domains including digital cameras, satellite images, medical images, surveillance video cameras and criminal investigations, etc. For example, the high resolution medical images help doctors to improve diagnostic accuracy and a surgical success rate. In application of the surveillance video camera, a tracking recognition rate is improved by enhancing a camera resolution, which may effectively provide the police more investigation clues.

Therefore, to enlarge a low resolution image to produce a high resolution image is always an important research issue in digital image processing, and image interpolation is a method related to an image enlargement technique. The image interpolation is generally implemented through single image enlargement, so that the image quality is greatly limited. For example, the commonly used signal image enlargement method includes polynomial interpolation, edge-directed interpolation and exampled-based for super-resolution.

Although the polynomial interpolation is simple and has a fast operation speed, the enlarged image is blurry due to lack of high-frequency information, and a block effect is generated. The edge-directed interpolation is to resolve the problem of the polynomial interpolation that the high-frequency information cannot be effectively presented. The high-frequency information refers to a texture and an edge region of the image, and this method focuses on preservation of the image edge, though a large amount of computations is required to accomplish the method. The exampled-based for super-resolution technique requires to establish a large high-low frequency corresponding database, and how to quickly find matched data from the large high-low frequency corresponding database is also a problem to be resolved.

SUMMARY OF THE INVENTION

Accordingly, the invention is directed to a digital image processing device, which is capable of enlarging a plurality of low resolution images to produce high resolution images, and blending a plurality of corrected images to output a super-resolution image.

The invention is directed to a digital image processing method, by which an image enlargement method is used to produce high resolution images, and a plurality of corrected images is blended to produce a super-resolution image.

The invention provides a digital image processing device including a digital image capturing module, an image enlarging module, an image correcting module, and an image blending module. The digital image capturing module captures a plurality of first resolution images. The image enlarging module is coupled to the digital image capturing module, and enlarges the resolution of the first resolution images to produce a plurality of second resolution images. The image correcting module is coupled to the image enlarging module, and selects one of the second resolution images to serve as a target image, and takes the remained second resolution images as a plurality of unselected images, where the image correcting module performs a plurality of motion corrections on the unselected images to produce a plurality of corrected images. The image blending module is coupled to the image correcting module, and performs a plurality of direction gradient operations on each of pixels of the target image and each of pixels of the corrected images, and performs a weighting sum operation on each of the pixels of the target image and each of the pixels of the corrected images according to a plurality of gradient differential values generated by the direction gradient operations, so as to produce a third resolution image, where the resolution of the third resolution image is higher than the resolution of the second resolution images.

In an embodiment of the invention, the image blending module performs the direction gradient operations to produce a plurality of direction gradient values, and the direction gradient values include a horizontal gradient value, a vertical gradient value and two diagonal gradient values.

In an embodiment of the invention, the horizontal gradient value is a sum of absolute values of grayscale differences of each of the pixels and two adjacent horizontal pixels, the vertical gradient value is a sum of absolute values of grayscale differences of each of the pixels and two adjacent vertical pixels, and the diagonal gradient values include a sum of absolute values of grayscale differences of each of the pixels and two adjacent first diagonal pixels and a sum of absolute values of grayscale differences of each of the pixels and two adjacent second diagonal pixels.

In an embodiment of the invention, in allusion to each of the pixels of the target image and each of the pixels of the corrected images, the image blending module selects a maximum one of the direction gradient values to serve as a maximum gradient value, and selects a minimum one of the direction gradient values to serve as a minimum gradient value, and each of the gradient differential values is obtained by subtracting the minimum gradient value from the maximum gradient value.

In an embodiment of the invention, the image correcting module includes a motion estimation unit and a motion correction unit. The motion estimation unit is coupled to the image enlarging module for producing a plurality of global motions. The motion correction unit is coupled to the motion estimation unit for performing the motion corrections on the unselected images according to the corresponding global motions, so as to produce the corrected images.

In an embodiment of the invention, the motion estimation unit includes a local motion estimator and a global motion estimator. The local motion estimator is used for dividing the target image and the unselected images into a plurality of blocks, and estimating a plurality of local motions between the target image and the unselected images. The global motion estimator is coupled to the local motion estimator, and performs a plurality of global motion estimations according to the local motions to produce the global motions.

In an embodiment of the invention, the motion corrections are performed by using a plurality of affine transformation matrices so that the positions of the start points of the unselected images are corrected to be the same as the position of the start point of the target image.

According to another aspect, the invention provides a digital image processing method, which is adapted to a digital image processing device having a plurality of first resolution images. The digital image processing method includes following steps. An image enlargement method is used to enlarge the resolution of the first resolution images to produce a plurality of second resolution images. Moreover, one of the second resolution images is selected as a target image, and the remained second resolution images are taken as unselected images, and a plurality of motion corrections are performed on the unselected images to produce a plurality of corrected images. Then, a plurality of direction gradient operations is performed on each of pixels of the target image and each of pixels of the corrected images, and a weighting sum operation is performed on each of the pixels of the target image and each of the pixels of the corrected images according to a plurality of gradient differential values generated by the direction gradient operations, so as to produce a third resolution image, where the resolution of the third resolution image is higher than the resolution of the second resolution images.

In an embodiment of the invention, the step of generating the gradient differential values according to the direction gradient operations includes selecting a maximum one of the direction gradient values to serve as a maximum gradient value, selecting a minimum one of the direction gradient values to serve as a minimum gradient value, and obtaining one of the gradient differential values by subtracting the minimum gradient value from the maximum gradient value.

In an embodiment of the invention, the step of performing the motion corrections on the unselected images includes producing a plurality of global motions, and performing the motion corrections to the unselected images according to the corresponding global motions, so as to produce the corrected images.

In an embodiment of the invention, the step of producing the global motions includes dividing the target image and the unselected images into a plurality of blocks, and estimating a plurality of local motions between the target image and the unselected images, and performing a plurality of global motion estimations according to the local motions to produce the global motions.

According to the above descriptions, in the invention, one or a plurality of low resolution images can be enlarged to produce high resolution images, by which more image information can be obtained compared to a general single image enlargement method, and multiple images are blended to produce a super-resolution image having high quality and rich detail information, and since sharpness is considered when the images are blended, the super-resolution image can maintain the image sharpness and meanwhile avoid a block effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
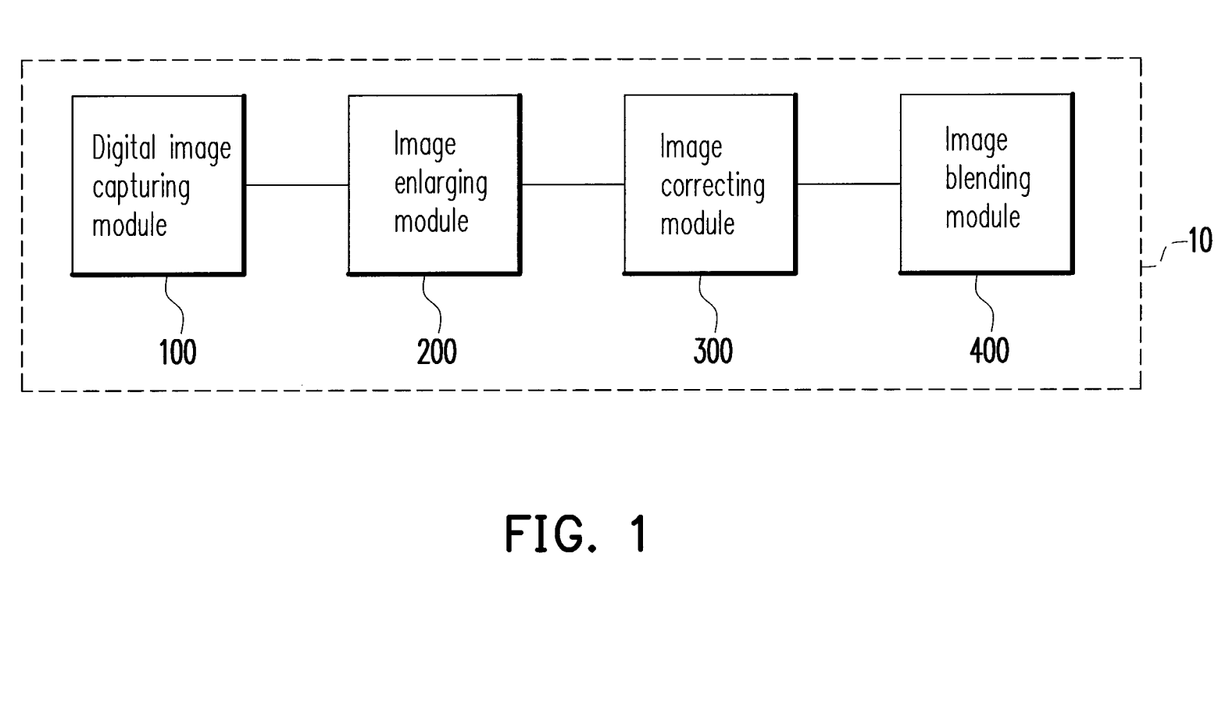
FIG. 1 is a block diagram of a digital image processing device according to an embodiment of the invention.

Referring to FIG. 1, FIG. 1 is a block diagram of a digital image processing device according to an embodiment of the invention. The digital image processing device 10 includes a digital image capturing module 100, an image enlarging module 200, an image correcting module 300, and an image blending module 400. The digital image capturing module 100 captures a plurality of first resolution images. The digital image capturing module 100 is, for example, an electronic product having a digital image capturing function, such as a digital camera, a digital video (DV) camera, etc. In the present embodiment, a digital image capturing device with a complementary metal-oxide semiconductor (CMOS) sensor can be used, and since a characteristic of the CMOS sensor is high-speed continuous shooting, a plurality of the first resolution images of one scene can be continuously captured.

The image enlarging module 200 is coupled to the digital image capturing module 100. The image enlarging module 200 enlarges resolutions of the first resolution images to produce a plurality of second resolution images. An image enlargement method used by the image enlarging module 200 includes a polynomial interpolation method, an edge-directed interpolation method or an exampled-based for super-resolution method, etc., which are well known by those skilled in the art. Therefore, the image enlargement method used by the image enlarging module 200 can be selected according to an actual design requirement, which is not limited by the invention.

The image correcting module 300 is coupled to the image enlarging module 200. The image correcting module 300 selects one of the second resolution images to serve as a target image, and takes the remained second resolution images that are not selected as the target image as unselected images. The image correcting module 300 performs motion corrections on the unselected images to produce a plurality of corrected images. The image blending module 400 is coupled to the image correcting module 300, and performs a plurality of direction gradient operations on each of the pixels of the target image and each of the pixels of the corrected images. Moreover, the image blending module 400 performs a weighting sum operation on each of the pixels of the target image and each of the pixels of the corrected images according to a plurality of gradient differential values generated by the direction gradient operations, so as to produce a third resolution image, where the resolution of the third resolution image is higher than the resolution of the second resolution images.

Figure 2:
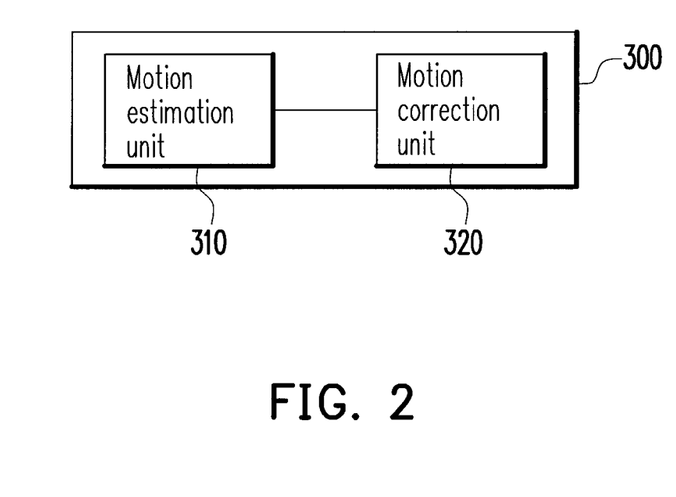
FIG. 2 is a schematic diagram illustrating an implementation of an image correcting module 300 according to an embodiment of the invention.

Referring to FIG. 1 and FIG. 2, FIG. 2 is a schematic diagram illustrating an implementation of the image correcting module 300 according to an embodiment of the invention. The image correcting module 300 includes a motion estimation unit 310 and a motion correction unit 320. The motion estimation unit 310 is coupled to the image enlarging module 200 for producing a plurality of global motions. The motion correction unit 320 is coupled to the motion estimation unit 310 for performing the motion corrections on the unselected images according to the corresponding global motions, so as to produce the corrected images.

Figure 3:
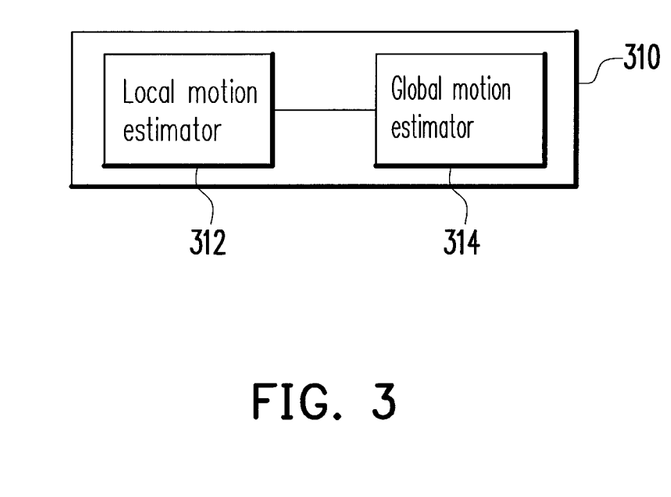
FIG. 3 is a schematic diagram illustrating an implementation of a motion estimation unit 310 according to an embodiment of the invention.

Moreover, FIG. 3 is a schematic diagram illustrating an implementation of the motion estimation unit 310 according to an embodiment of the invention. Referring to FIG. 2 and FIG. 3, the motion estimation unit 310 may include a local motion estimator 312 and a global motion estimator 314. The local motion estimator 312 is used for dividing the target image and the unselected images into a plurality of blocks, and estimating a plurality of local motions between the target image and the unselected images. The global motion estimator 314 is coupled to the local motion estimator 312, and performs global motion estimations according to the local motions to produce the global motions.

Figure 4:
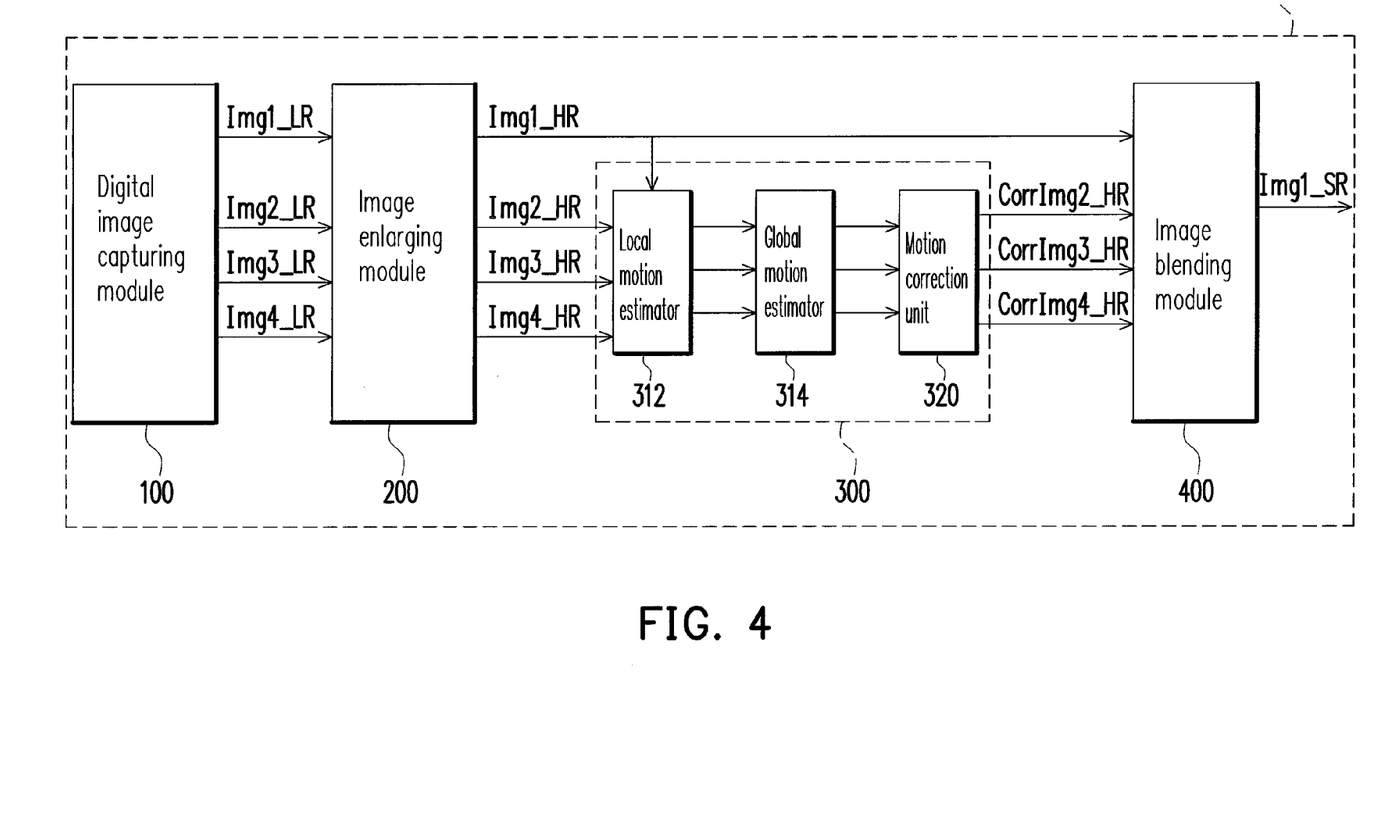
FIG. 4 is a block diagram of a digital image processing device according to another embodiment of the invention.

In order to fully convey the spirit of the invention, another embodiment is provided below for detail descriptions. FIG. 4 is a block diagram of a digital image processing device according to another embodiment of the invention.

Referring to FIG. 4, first, the digital image capturing module 100 is used for capturing four first resolution (which is a low resolution in the present embodiment) images Img1_LR, Img3_LR and Img4_LR, and in the present embodiment, four low resolution images are taken as an example for descriptions, though the number of the captured images is not limited by the invention. It should be noticed that when the handheld digital image capturing device 100 is used to continuously capture images, a hand shake phenomenon is probably occurred, which may cause a sub-pixel movement between the images.

The image enlarging module 200 uses an image enlargement method to enlarge the resolution of the first resolution images to produce a plurality of second resolution images. In the present embodiment, four second resolution (for example, a high resolution) images Img1_HR, Img2_HR, Img3_HR and Img4_HR are produced. Then, the image correcting module 300 selects one of the second resolution images to serve as a target image, and takes the remained second resolution images as unselected images. The image correcting module 300 performs motion corrections on the unselected images to produce a plurality of corrected images. Selection of the target image is determined by the user. Here, one of the four high resolution images Img1_HR is set as the target image, the remained high resolution images Img2_HR, Img3_HR and Img4_HR are set as the unselected images.

After the target image Img1_HR is selected, the local motion estimator 312 performs motion estimations on the unselected images Img2_HR, Img3_HR and Img4_HR relative to the target image Img1_HR. In detail, the local motion estimator 312 divides the target image Img1_HR and the unselected images Img2_HR, Img3_HR and Img4_HR into a plurality of blocks by using a same method. For example, if the size of the target image and the unselected images is P×Q, the target image and the unselected images can be divided into M×N blocks, where M, N, P and Q are integers greater than 1, M is smaller than or equal to P, and N is smaller than or equal to Q. Therefore, the dividing method can be set according to an actual design requirement, which is not limited by the invention.

Then, the local motion estimator 312 performs local motion estimations to respectively compare each block of the unselected images Img2_HR, Img3_HR and Img4_HR with the target image Img1_HR according to, for example, a block comparison method, so as to obtain a plurality of local motions of each of the unselected images Img2_HR, Img3_HR and Img4_HR relative to the target image Img1_HR. Then, the global motion estimator 314 performs global motion estimations according to the local motions. For example, a method of the global motion estimation is to get a mode of the local motions, i.e. the local motions are first taken statistics to select a local motion occurring most frequently to serve as the global motion, or all of the local motions are averaged to obtain the global motion, etc. Therefore, each of the unselected images Img2_HR, Img3_HR and Img4_HR has the respective global motion.

The motion correction unit 320 performs the motion corrections according to the corresponding global motions. The motion correction is performed by using a plurality of affine transformation matrices so that the positions of the start points of the unselected images Img2_HR, Img3_HR and Img4_HR are corrected to be the same as the position of the start point of the target image Img1_HR. The affine transformation matrix can be used for rotation and motion corrections, and coefficients of the matrix are obtained according to the global motions. An equation of the affine transformation matrix is as follows:

$$\begin{pmatrix} x' \\ y' \\ 1 \end{pmatrix} = \begin{pmatrix} \cos\theta & -\sin\theta & d_x \\ \sin\theta & \cos\theta & d_y \\ 0 & 0 & 1 \end{pmatrix} \begin{pmatrix} x \\ y \\ 1 \end{pmatrix}$$

Where, $\theta$ is a rotation angle of the unselected images and the target image, $d_x$ is a horizontal motion of the unselected images and the target image, $d_y$ is a vertical motion of the unselected images and the target image, x and y are coordinate values of an original pixel on horizontal and vertical axes, x' and y' are coordinate values of the corrected pixel on the horizontal and vertical axes.

According to the above descriptions, corrected images CorrImg2_HR, CorrImg3_HR and CorrImg4_HR are obtained. The image blending module 400 blends each of the pixels of the target image Img1_HR and each of the pixels of the corrected images CorrImg2_HR, CorrImg3_HR and CorrImg4_HR to produce a third resolution (for example, the super-resolution) image Img1_SR.

Figure 5:
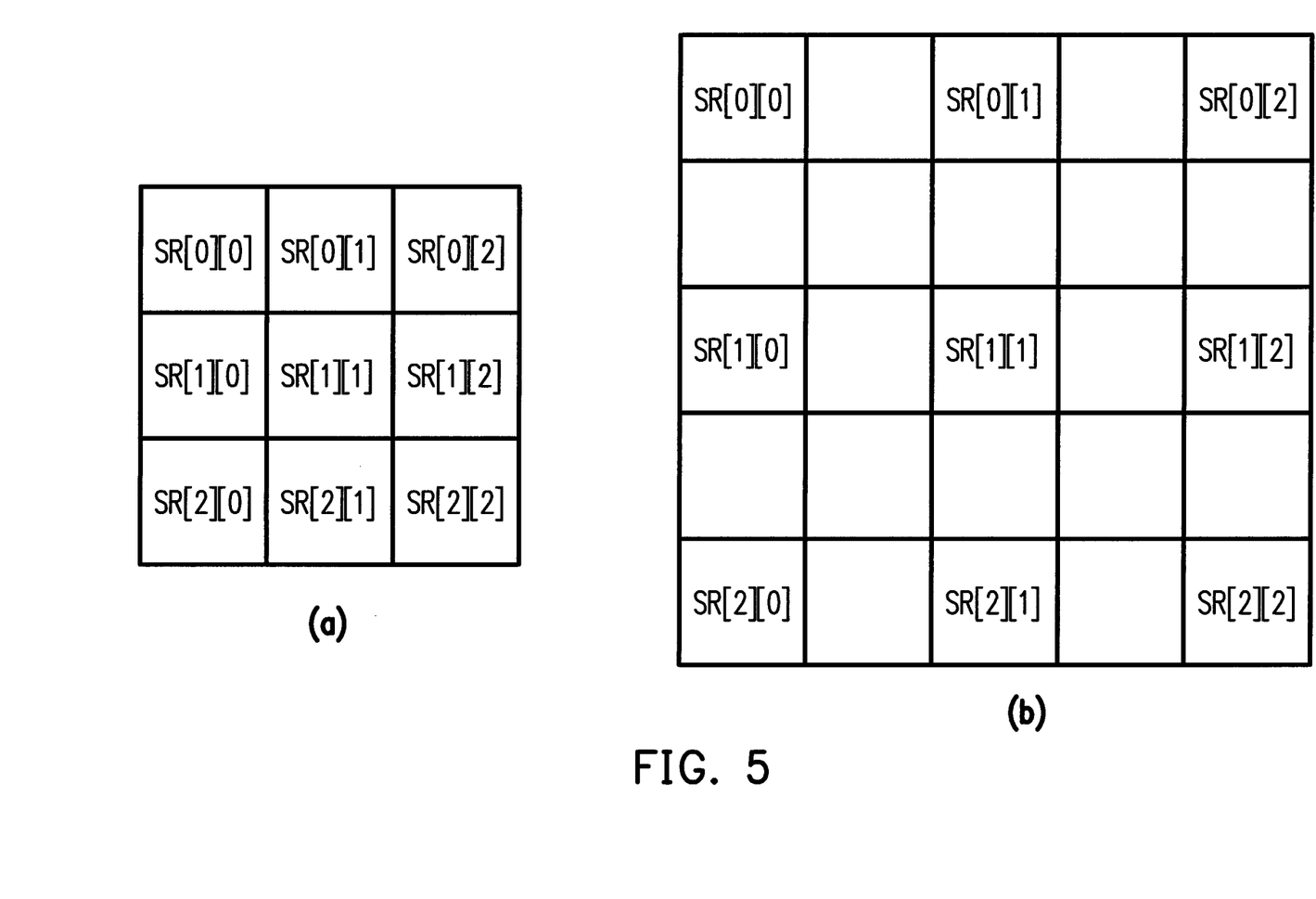
FIG. 5 is a schematic diagram of an R×R mask according to an embodiment of the invention, in which (a) is a 3×3 mask and (b) is a 5×5 mask.

A following operation is performed on each of the pixels of the target image Img1_HR and each of the pixels of the corrected images CorrImg2_HR, CorrImg3_HR and CorrImg4_HR: an R×R mask is used to perform a plurality of direction gradient operations, where R is an integer greater than 1, for example, a 3×3 or 5×5 mask, as that shown in FIG. 5, and FIG. 5 is a schematic diagram of an R×R mask according to an embodiment of the invention, in which (a) is the 3×3 mask and (b) is the 5×5 mask. The direction gradient operation is used to produce a plurality of direction gradient values including a horizontal gradient value H_Gra, a vertical gradient value V_Gra, and two diagonal gradient values D−_Gra and D+_Gra, and direction gradient operation formulas are as follows (with reference of FIG. 5):

H_Gra=|SR[1][0]−SR[1][1]|+|SR[1][2]−SR[1][1]|

V_Gra=|SR[0][1]−SR[1][1]|+|SR[2][1]−SR[1][1]|

D−_Gra=|SR[0][0]−SR[1][1]|+|SR[2][2]−SR[1][1]|

D+_Gra=|SR[0][2]−SR[1][1]|+|SR[2][0]−SR[1][1]|

Where, the values SR[1][0]–SR[2][2] as illustrated in FIG. 5 represents grayscales of the masked image pixels.

After the direction gradient values are obtained, a maximum one of the direction gradient values is selected as a maximum gradient value, and a minimum one of the direction gradient values is selected as a minimum gradient value, and a gradient differential value is obtained by subtracting the minimum gradient value from the maximum gradient value. A physical meaning of the gradient differential value is to represent whether a texture or an image edge exists around the pixel, and the greater the gradient differential value is, the higher possibility that the texture or the image edge exists around the pixel. Therefore, the gradient differential value is taken as a weight. A weighting sum operation is performed on each of the pixels of the target image Img1_HR and the corresponding pixel of the corrected images CorrImg2_HR, CorrImg3_HR and CorrImg4_HR according to the gradient differential values, so as to produce a blended image, a computing formula of the weighting sum operation FV is as follows:

$$FV = \frac{\sum_{n=0}(\text{Weight}[n] \times \text{img}[n])}{\sum_{n=0} \text{Weight}[n]}$$

Where, n represents an $n^{th}$ image, Weight[n] represents the gradient differential value of one of the pixels of the $n^{th}$ image, and img[n] represents a grayscale of one of the pixels of the $n^{th}$ image.

The image blending module 400 performs the direction gradient operation and the blending operation on each of the pixels of the target image Img1_HR and each of the pixels of the corrected images CorrImg2_HR, CorrImg3_HR and CorrImg4_HR, and outputs the super-resolution image Img1_SR. In an image flat region, the gradient differential values of the target image Img1_HR and the corrected images CorrImg2_HR, CorrImg3_HR and CorrImg4_HR are quite small, so that the blending operation may have an average effect, which may also have an effect of reducing noises.

Figure 6:
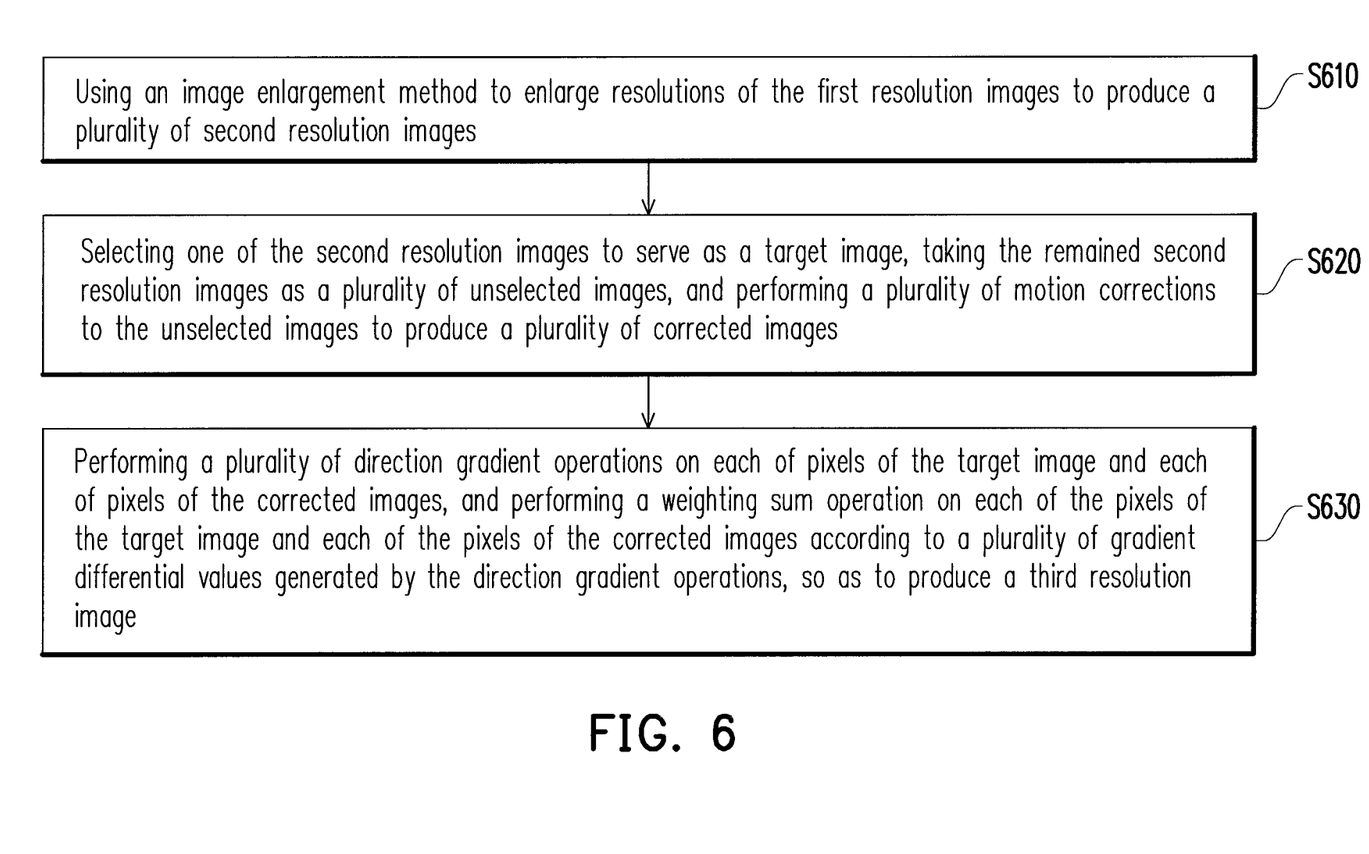
FIG. 6 is a flowchart illustrating a digital image processing method according to an embodiment of the invention.

A digital image processing method is deduced according to the above descriptions, as that shown in FIG. 6, which is adapted to a digital processing device having a plurality of first resolution images. FIG. 6 is a flowchart illustrating a digital image processing method according to an embodiment of the invention. Referring to FIG. 6, in step S610, an image enlargement method is used to enlarge resolutions of the first resolution images to produce a plurality of second resolution images. In step S620, one of the second resolution images is selected as a target image, and the remained second resolution images are taken as unselected images, and motion corrections are performed on the unselected images to produce a plurality of corrected images. In step S630, a plurality of direction gradient operations is performed on each of the pixels of the target image and each of the pixels of the corrected images, and a weighting sum operation is performed on each of the pixels of the target image and each of the pixels of the corrected images according to a plurality of gradient differential values generated by the direction gradient operations, so as to produce a third resolution image. Other details of the present embodiment have been described in the aforementioned embodiments, so that details thereof are not repeated.

In summary, in the invention, one or a plurality of low resolution images are enlarged to produce the high resolution images, by which more image information can be obtained compared to a general single image enlargement method, and multiple images are blended to produce a super-resolution image having high quality and rich detail information, and since the direction gradient operation method is used during the image blending operation, sharpness of each image can be determined, and the image with higher sharpness has a higher weight during the blending operation, so that the blended super-resolution image can maintain the image sharpness and meanwhile avoid a block effect to reduce the noises.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A digital image processing device, comprising:
a digital image capturing module, capturing a plurality of first resolution images;
an image enlarging module, coupled to the digital image capturing module, and enlarging a resolution of the first resolution images to produce a plurality of second resolution images;
an image correcting module, coupled to the image enlarging module, and selecting one of the second resolution images to serve as a target image, and taking the remaining second resolution images as a plurality of unselected images, wherein the image correcting module performs a plurality of motion corrections on the unselected images respectively to produce a plurality of corrected images; and
an image blending module, coupled to the image correcting module, and performing a plurality of direction gradient operations on each of pixels of the target image and each of pixels of the corrected images, and performing a weighting sum operation on each of the pixels of the target image and each of the pixels of the corrected images according to a plurality of gradient differential values generated by the direction gradient operations, so as to produce a third resolution image,
wherein a resolution of the third resolution image is higher than a resolution of the second resolution images.

2. The digital image processing device as claimed in claim 1, wherein the image blending module performs the direction gradient operations to produce a plurality of direction gradient values, and the direction gradient values comprise a horizontal gradient value, a vertical gradient value and two diagonal gradient values.

3. The digital image processing device as claimed in claim 2, wherein the horizontal gradient value is a sum of absolute values of grayscale differences of each of the pixels and two adjacent horizontal pixels, the vertical gradient value is a sum of absolute values of grayscale differences of each of the pixels and two adjacent vertical pixels, and the diagonal gradient values comprise a sum of absolute values of grayscale differences of each of the pixels and two adjacent first diagonal pixels and a sum of absolute values of grayscale differences of each of the pixels and two adjacent second diagonal pixels.

4. The digital image processing device as claimed in claim 2, wherein in allusion to each of the pixels of the target image and each of the pixels of the corrected images, the image blending module selects a maximum one of the direction gradient values to serve as a maximum gradient value, and selects a minimum one of the direction gradient values to serve as a minimum gradient value, and each of the gradient differential values is obtained by subtracting the minimum gradient value from the maximum gradient value.

5. The digital image processing device as claimed in claim 1, wherein the image correcting module comprises:
a motion estimation unit, coupled to the image enlarging module, for producing a plurality of global motions; and
a motion correction unit, coupled to the motion estimation unit, for performing the motion corrections on the unselected images according to the corresponding global motions, so as to produce the corrected images.

6. The digital image processing device as claimed in claim 5, wherein the motion estimation unit comprises:
a local motion estimator, dividing the target image and the unselected images into a plurality of blocks, and estimating a plurality of local motions between the target image and the unselected images; and
a global motion estimator, coupled to the local motion estimator, and performing a plurality of global motion estimations according to the local motions to produce the global motions.

7. The digital image processing device as claimed in claim 1, wherein the motion corrections are performed by using a plurality of affine transformation matrices so that the positions of the start points of the unselected images are corrected to be the same as the position of the start point of the target image.

8. A digital image processing method, adapted to a digital image processing device having a plurality of first resolution images, and the digital image processing method comprising:
using an image enlargement method to enlarge a resolution of the first resolution images to produce a plurality of second resolution images;
selecting one of the second resolution images to serve as a target image, taking the remaining second resolution images as a plurality of unselected images, and performing a plurality of motion corrections on the unselected images respectively to produce a plurality of corrected images; and
performing, using an image blending module, a plurality of direction gradient operations on each of pixels of the target image and each of pixels of the corrected images, and performing a weighting sum operation on each of the pixels of the target image and each of the pixels of the corrected images according to a plurality of gradient differential values generated by the direction gradient operations, so as to produce a third resolution image,
wherein a resolution of the third resolution image is higher than a resolution of the second resolution images.

9. The digital image processing method as claimed in claim 8, wherein the direction gradient operations produce a plurality of direction gradient values, and the direction gradient values comprise a horizontal gradient value, a vertical gradient value and two diagonal gradient values.

10. The digital image processing method as claimed in claim 9, wherein the horizontal gradient value is a sum of absolute values of grayscale differences of each of the pixels and two adjacent horizontal pixels, the vertical gradient value is a sum of absolute values of grayscale differences of each of the pixels and two adjacent vertical pixels, and the diagonal gradient values comprise a sum of absolute values of grayscale differences of each of the pixels and two adjacent first diagonal pixels and a sum of absolute values of grayscale differences of each of the pixels and two adjacent second diagonal pixels.

11. The digital image processing method as claimed in claim 9, wherein the step of generating the gradient differential values according to the direction gradient operations comprises:
selecting a maximum one of the direction gradient values to serve as a maximum gradient value;
selecting a minimum one of the direction gradient values to serve as a minimum gradient value; and
obtaining one of the gradient differential values by subtracting the minimum gradient value from the maximum gradient value.

12. The digital image processing method as claimed in claim 8, wherein the step of performing the motion corrections on the unselected images comprises:
producing a plurality of global motions; and
performing the motion corrections on the unselected images according to the corresponding global motions, so as to produce the corrected images.

13. The digital image processing method as claimed in claim 12, wherein the step of producing the global motions comprises:
dividing the target image and the unselected images into a plurality of blocks;
estimating a plurality of local motions between the target image and the unselected images; and
performing a plurality of global motion estimations according to the local motions to produce the global motions.

14. The digital image processing method as claimed in claim 8, wherein the motion corrections are performed by using a plurality of affine transformation matrices so that the positions of the start points of the unselected images are corrected to be the same as the position of the start point of the target image.

* * * * *